United States Patent
Ishii et al.

(10) Patent No.: US 12,344,224 B2
(45) Date of Patent: Jul. 1, 2025

(54) UTILITY VEHICLE CONTROLLABLE WITHIN PERMISSIBLE RANGE BASED ON DETERMINED ROAD CONDITION LEVEL

(71) Applicant: KAWASAKI MOTORS, LTD., Akashi (JP)

(72) Inventors: Hiroshi Ishii, Akashi (JP); Taro Iwamoto, Akashi (JP); Takeshi Nakajima, Akashi (JP); Kazuya Nagasaka, Kobe (JP); Atsushi Sano, Kobe (JP); Kazuhiro Ichikawa, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 250 days.

(21) Appl. No.: 17/927,353

(22) PCT Filed: May 28, 2020

(86) PCT No.: PCT/JP2020/021165
§ 371 (c)(1),
(2) Date: Nov. 22, 2022

(87) PCT Pub. No.: WO2021/240742
PCT Pub. Date: Dec. 2, 2021

(65) Prior Publication Data
US 2023/0202451 A1    Jun. 29, 2023

(51) Int. Cl.
*B60W 40/06* (2012.01)
*B60W 10/10* (2012.01)
(Continued)

(52) U.S. Cl.
CPC ............ *B60W 10/22* (2013.01); *B60W 10/10* (2013.01); *B60W 40/06* (2013.01);
(Continued)

(58) Field of Classification Search
CPC ...... B60W 10/22; B60W 10/10; B60W 40/06; B60W 40/105; B60W 40/11;
(Continued)

(56) References Cited

U.S. PATENT DOCUMENTS

| | | | |
|---|---|---|---|
| 8,706,394 B2 * | 4/2014 | Trepagnier | G01S 17/931 701/28 |
| 10,699,347 B1 * | 6/2020 | Slusar | G01C 21/3461 |
| 10,852,746 B2 * | 12/2020 | Silver | G01S 13/95 |
| 2015/0032373 A1 | 1/2015 | Ikari | |
| 2017/0234689 A1 * | 8/2017 | Gibson | G01C 21/3461 701/25 |

(Continued)

FOREIGN PATENT DOCUMENTS

| | | |
|---|---|---|
| DE | 102019000363 A1 | 8/2019 |
| JP | 2000300009 A | 10/2000 |

(Continued)

*Primary Examiner* — Dino Kujundzic
(74) *Attorney, Agent, or Firm* — Alleman Hall & Tuttle LLP

(57) ABSTRACT

A utility vehicle includes: a travel structure including a front wheel, a rear wheel, a steering structure mounted to the front wheel, and a drive source that drives the front wheel and/or the rear wheel; circuitry that controls the travel structure to effect autonomous travel without manned operation in a given travel area; and a vehicle location detector that detects a location of the utility vehicle. During the autonomous travel, the circuitry determines, based on road condition data where the travel area is divided into regions with different predetermined road condition levels, to which of the road condition levels a road condition of a region ahead of the location of the utility vehicle in a travel direction belongs, and the circuitry controls the travel structure such that a given travel parameter is within a corresponding one of permissible ranges predetermined respectively in association with the road condition levels.

8 Claims, 4 Drawing Sheets

(51) Int. Cl.
*B60W 10/22* (2006.01)
*B60W 40/105* (2012.01)
*B60W 40/11* (2012.01)
*B60W 40/112* (2012.01)
*B60W 60/00* (2020.01)

(52) U.S. Cl.
CPC .......... *B60W 40/105* (2013.01); *B60W 40/11* (2013.01); *B60W 40/112* (2013.01); *B60W 60/0011* (2020.02); *B60W 60/005* (2020.02); B60W 2300/185 (2013.01); B60W 2520/105 (2013.01); B60W 2520/16 (2013.01); B60W 2520/18 (2013.01); B60W 2540/18 (2013.01); B60W 2556/50 (2020.02)

(58) Field of Classification Search
CPC ............ B60W 40/112; B60W 60/0011; B60W 60/005; B60W 2300/185; B60W 2520/105; B60W 2520/16; B60W 2520/18; B60W 2540/18; B60W 2556/50; G01C 21/34
See application file for complete search history.

(56) References Cited

U.S. PATENT DOCUMENTS

| | | |
|---|---|---|
| 2020/0033143 A1 | 1/2020 | Hiramatsu |
| 2020/0101974 A1* | 4/2020 | Ha ........................ H04W 4/024 |
| 2020/0117203 A1 | 4/2020 | Yang et al. |
| 2020/0319636 A1* | 10/2020 | Urano ............... B60W 60/0053 |
| 2020/0363811 A1 | 11/2020 | Nishii |
| 2021/0031797 A1* | 2/2021 | Hayashida ........ B60W 60/0025 |

FOREIGN PATENT DOCUMENTS

| | | |
|---|---|---|
| JP | 2005077299 A | 3/2005 |
| JP | 2005215742 A | 8/2005 |
| JP | 2008185418 A | 8/2008 |
| JP | 2009205652 A | 9/2009 |
| JP | 2018120491 A | 8/2018 |
| JP | 2019169058 A | 10/2019 |
| JP | 2020013379 A | 1/2020 |
| WO | 2013122065 A1 | 8/2013 |
| WO | 2019111535 A1 | 6/2019 |

* cited by examiner

UTILITY VEHICLE CONTROLLABLE WITHIN PERMISSIBLE RANGE BASED ON DETERMINED ROAD CONDITION LEVEL

CROSS REFERENCE TO RELATED APPLICATIONS

This application is a national phase application of International Application No. PCT/JP2020/021165, filed on May 28, 2020, entitled UTILITY VEHICLE, the entire disclosure of which is incorporated herein by reference for all purposes.

TECHNICAL FIELD

The present disclosure relates to a utility vehicle.

BACKGROUND ART

A utility vehicle able to travel on rough terrain and the like is used for works such as conveyance of crops etc. and monitoring in premises. It is envisaged that such a work requires the vehicle to travel on a predetermined travel route and is routinely repeated.

In recent years, various kinds of technology for autonomous driving of automobiles have been proposed. For example, Patent Literature 1 discloses a system in which an autonomous driving vehicle travels on a predetermined travel route. This system eliminates the need for manned operation in travel on the predetermined travel route.

CITATION LIST

PATENT LITERATURE

PTL 1: Japanese Laid-Open Patent Application Publication No. 2020-13379

SUMMARY OF INVENTION

Technical Problem

Such a conventional autonomous driving vehicle as mentioned above is not designed to travel on rough terrain. In the conventional autonomous driving vehicle, for example, upon the determination that there is an obstacle ahead of the vehicle, control is performed to avoid the obstacle or stop the vehicle. In contrast, a utility vehicle for travel on rough terrain is able to pass over some kinds of obstacles. Thus, autonomous driving of the utility vehicle for travel on rough terrain requires a different kind of control than autonomous driving of the conventional vehicle which travels on ordinary roads.

It is therefore an object of the present disclosure to provide a utility vehicle able to travel on rough terrain and capable of appropriate control of autonomous travel.

Solution to a Problem

A utility vehicle according to one aspect of the present disclosure includes: a travel structure including a front wheel, a rear wheel, a steering structure mounted to the front wheel, and a drive source that drives the front wheel and/or the rear wheel; circuitry that controls the travel structure to effect autonomous travel without manned operation in a given travel area; and a vehicle location detector that detects a location of the utility vehicle, wherein during the autonomous travel, the circuitry determines, based on road condition data where the travel area is divided into regions with different predetermined road condition levels, to which of the road condition levels a road condition of a region ahead of the location of the utility vehicle in a travel direction belongs, and the circuitry controls the travel structure such that a given travel parameter is within a corresponding one of permissible ranges predetermined respectively in association with the road condition levels.

Advantageous Effects of Invention

In accordance with the present disclosure, during the autonomous travel of the utility vehicle, the travel structure is controlled in different ways depending on the road condition level of the region ahead of the location of the utility vehicle in the travel direction. Thus, autonomous travel control in a place with a bad road condition can be made different from that in a place with a good road condition; for example, the vehicle velocity during the autonomous travel can be reduced in a place with a bad road condition. As such, the autonomous travel of the utility vehicle able to travel on rough terrain can be controlled appropriately according to the road condition.

DESCRIPTION OF EMBODIMENTS

Hereinafter, exemplary embodiments will be described with reference to the drawings. The same or like elements are denoted by the same reference signs throughout the drawings and will not be described repeatedly.

Configuration of Vehicle

Figure 1:
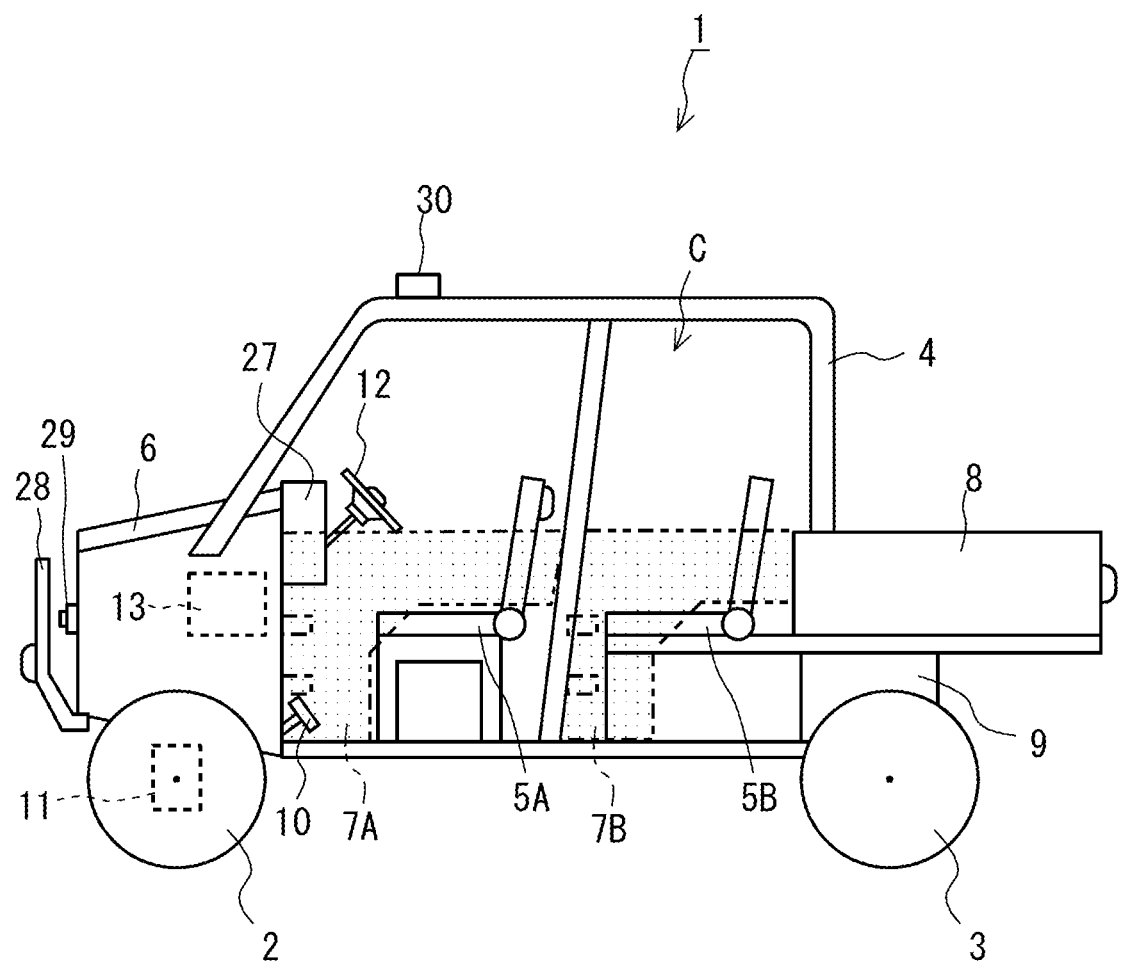
FIG. 1 is a schematic left side view showing a utility vehicle of an exemplary embodiment.

FIG. 1 is a schematic left side view showing a utility vehicle of an exemplary embodiment. The utility vehicle 1 (simply referred to as "vehicle 1" hereinafter) of FIG. 1 includes a pair of left and right front wheels 2 and a pair of left and right rear wheels 3. The front and rear wheels 2 and 3 support a vehicle body frame 4. The vehicle body frame 4 is a pipe frame constituted by pipes connected together.

The vehicle body frame 4 supports a front seat structure 5A and a rear seat structure 5B. The front seat structure 5A includes a driver seat. The seats are not limited to being arranged in two rows, and may be arranged in a single row. The vehicle body frame 4 encloses a cabin C including the front and rear seat structures 5A and 5B. That is, the cabin C is defined by the vehicle body frame 4. A hood 6 is located ahead of the cabin C (front seat structure 5A). The hood 6 is supported by the front of the vehicle body frame 4 and covers from above the space between the left and right front wheels 2. The hood 6 is openable.

Front side doors 7A are located to the left and right of the front seat structure 5A, and rear side doors 7B are located to the left and right of the rear seat structure 5B. The side doors 7A and 7B are supported by the vehicle body frame 4. Each of the side doors 7A and 7B opens and closes by pivoting relative to the vehicle body frame 4 about a pivot shaft located at the front end of the side door 7A or 7B. This allows occupants to get in or out of the vehicle 1. In FIG. 1, the side doors 7A and 7B are depicted as being see-through to show the space (cabin C) inside the side doors 7A and 7B.

A cargo bed 8 is located behind the cabin C (rear seat structure 5B). The rear of the vehicle body frame 4 supports the cargo bed 8. A drive source 9 supported by the vehicle body frame 4 is located beneath the cargo bed 8. The drive source 9 is, for example, an engine. Alternatively, the drive source 9 may be an electric motor or a combination of an engine and an electric motor. The drive source 9 drives the drive wheels (front wheels 2 and/or rear wheels 3).

A first operator 10 including an accelerator pedal and a brake pedal is located ahead of and below the driver seat (in the area around the feet of the driver). Operating the accelerator pedal produces a change in the drive power of the drive source 9. Unshown brakes are mounted to the front and rear wheels 2 and 3, and operating the brake pedal induces deceleration of the vehicle 1. Thus, the first operator 10 is configured as an operator for acceleration and deceleration of the vehicle 1.

A steering structure 11 is mounted to the front wheels 2. A steering wheel 12 as a second operator is located in front of the driver seat of the front seat structure 5A. The steering wheel 12 is connected to the steering structure 11. In response to an operation on the steering wheel 12, the steering structure 11 moves to steer the front wheels 2. Thus, the second operator is configured as an operator for turning of the vehicle 1.

The vehicle 1 further includes a transmission (not shown) located between and connected to the drive source 9 and the drive wheels. The transmission changes the gear ratio or the travel direction (forward or rearward) based on an operation on a third operator such as an unshown gear shift lever.

As described above, a travel structure 14 for travel of the vehicle 1 includes the front wheels 2, the rear wheels 3, the steering structure 11, the drive source 9, the brakes, and the transmission. The operators used to operate the travel structure 14 include the first, second, and third operators.

The vehicle 1 further includes circuitry 13 that controls the travel structure 14. To the circuitry 13 are connected various sensors described below. The circuitry 13 acquires detection values of the sensors. The circuitry 13 is configured as electronic circuitry that includes a processor, a volatile memory, a non-volatile memory (storage), and an I/O interface and in which the processor performs computation procedures based on programs stored in the non-volatile memory and by means of the volatile memory to accomplish various kinds of control.

Configuration of Control System

Figure 2:
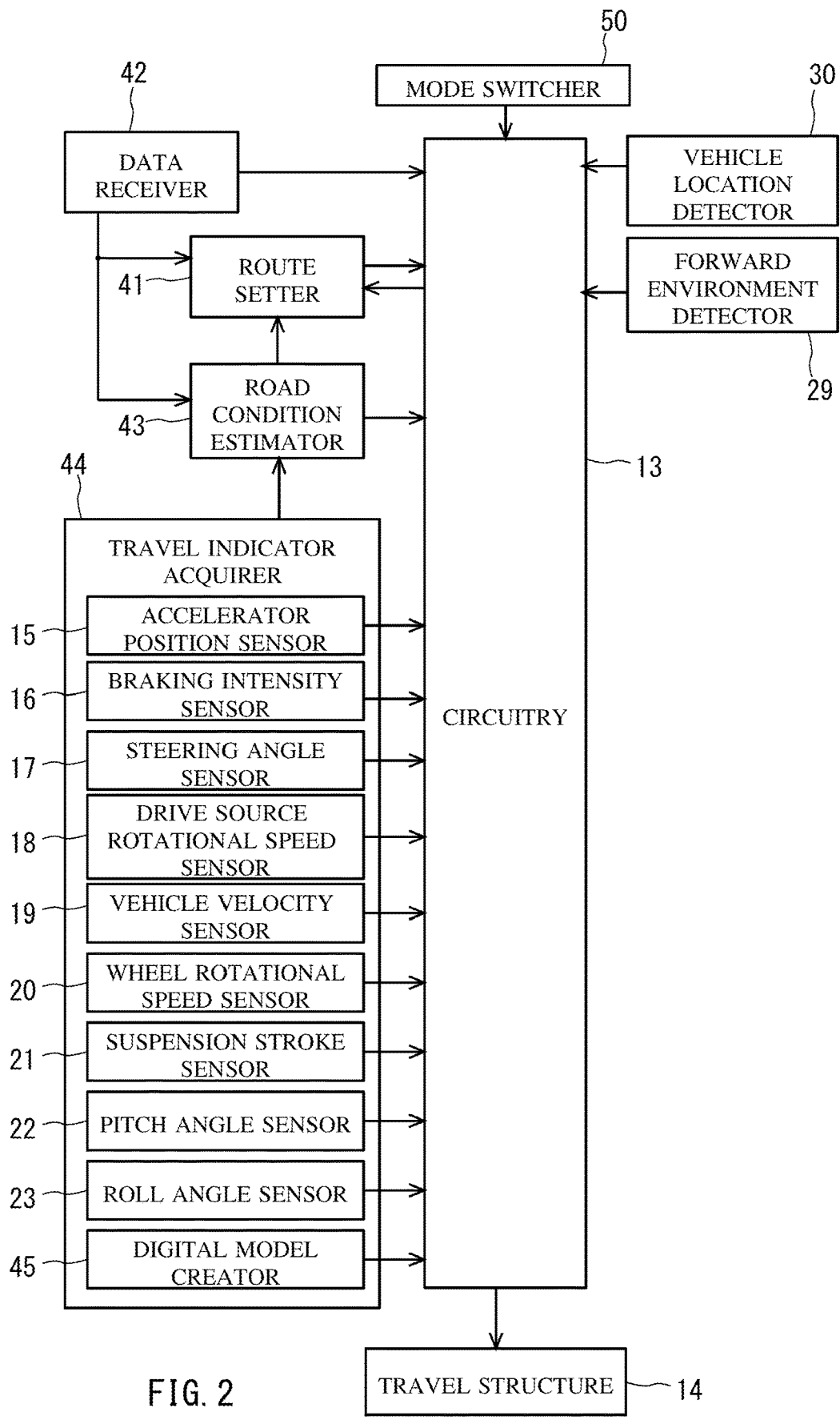
FIG. 2 is a block diagram showing a schematic configuration of a control system of the utility vehicle of FIG. 1.

FIG. 2 is a block diagram showing a schematic configuration of the control system of the utility vehicle of FIG. 1. As shown in FIG. 2, various sensors are connected to the circuitry 13. The sensors detect vehicle state parameters related to the travel system including the operators and the travel structure 14.

The sensors include, for example, an accelerator position sensor 15, a braking intensity sensor 16, a steering angle sensor 17, a drive source rotational speed sensor 18, a vehicle velocity sensor 19, a wheel rotational speed sensor 20, a suspension stroke sensor 21, a pitch angle sensor 22, and a roll angle sensor 23. The vehicle 1 may include all or some of these sensors and may include other sensors.

The accelerator position sensor 15 detects the amount of operation of the accelerator pedal. The braking intensity sensor 16 detects the amount of operation of the brake pedal. The steering angle sensor 17 detects the direction and amount of operation of the steering wheel 12. The drive source rotational speed sensor 18 detects the rotational speed of the output shaft of the drive source 9. The vehicle velocity sensor 19 detects the velocity of the vehicle 1.

The wheel rotational speed sensor 20 detects the rotational speed of a corresponding one of the wheels 2 and 3. The wheel rotational speed sensor 20 may be mounted to each of the four wheels (the left and right front wheels 2 and left and right rear wheels 3). Instead of using the vehicle velocity sensor 19, the vehicle velocity may be determined from the rotational speeds of the drive wheels (e.g., the rear wheels 3). The suspension stroke sensor 21 detects the amount of extension or compression of a corresponding one of the suspensions (not shown) which are mounted respectively to the wheels 2 and 3 of the vehicle 1. The suspension stroke sensor 21 may be mounted to each of the four suspensions which are mounted respectively to the four wheels.

The pitch angle sensor 22 detects the rotational angle of the vehicle 1 about a pitch axis (an imaginary rotational axis extending in the vehicle width direction) of the vehicle 1. Instead of using the pitch angle sensor 22, the pitch angle may be detected from the difference in the amount of extension or compression detected by the suspension stroke sensor 21 between the front and rear suspensions. The roll angle sensor 23 detects the rotational angle of the vehicle 1 about a roll axis (an imaginary rotational axis extending in the vehicle front-rear direction) of the vehicle 1. Instead of using the roll angle sensor 23, the roll angle may be detected from the difference in the amount of extension or compression detected by the suspension stroke sensor 21 between the left and right suspensions.

The circuitry 13 controls the travel structure 14 to effect autonomous travel without manned operation in a given travel area. A mode switcher 50 is connected to the circuitry 13. The mode switcher 50 switches the vehicle 1 between a manned operation mode in which the vehicle 1 travels in response to operations on the operators and an autonomous travel mode in which the circuitry 13 allows the vehicle 1 to autonomously travel on a given travel route without any operations on the operators.

The mode switcher 50 sends a mode switching signal to the circuitry 13 based on switching by means of a switch or a certain authentication operation. In response to the received mode switching signal, the circuitry 13 switches the control mode between the manned operation mode and the autonomous travel mode.

In the manned operation mode, the circuitry 13 controls the travel structure 14 in response to inputs provided to the operators by the driver. For example, the circuitry 13 performs output adjustment of the drive source 9 (e.g., throttle position control in the case where the drive source 9 is an engine) based on the accelerator position that the accelerator position sensor 15 detects in response to an operation performed on the accelerator pedal by the driver. For example, the circuitry 13 performs steering angle adjustment of the steering structure 11 based on the steering angle and steering direction that the steering angle sensor 17 detects in response to an operation performed on the steering wheel 12 by the driver.

In the autonomous travel mode, the circuitry 13 allows the vehicle 1 to autonomously travel on a given travel route without any operations on the operators. For example, the vehicle 1 includes a forward environment detector 29 that detects the state of an environment ahead of the vehicle 1 and a vehicle location detector 30 that detects the location of the vehicle 1.

The forward environment detector 29 includes, for example, at least one of a camera, radars, or a laser sensor. The circuitry 13 analyzes the forward environment based on image data of the forward environment as acquired by the camera and/or distance data as acquired by the radars or the laser sensor. The circuitry 13 controls the travel structure 14 based on the result of the analysis of the forward environment. For example, in the event that there is an obstacle ahead of the vehicle 1, the circuitry 13 controls the drive source 9 and/or brakes (not shown) to decelerate or stop the vehicle 1 or controls the steering structure 11 to change the travel direction of the vehicle 1.

The vehicle location detector 30 includes, for example, a GPS antenna. Data of a predetermined travel route is stored in the storage of the circuitry 13. In the autonomous travel mode, the circuitry 13 retrieves the data of the travel route and controls the travel structure 14 based on vehicle location information received from the vehicle location detector 30, thus allowing the vehicle 1 to travel on the travel route. Additionally, the circuitry 13 makes a minor adjustment to the travel route based on the result of the above-described analysis of the forward environment. For example, in the event that there is an obstacle ahead of the vehicle 1, the circuitry 13 performs rerouting of the travel route.

The vehicle 1 includes a route setter 41 that sets a travel route for autonomous travel. The route setter 41 may be configured as a control block of the circuitry 13 or may be embodied by a computer separate from the circuitry 13. In the case where the route setter 41 is embodied by a computer separate from the circuitry 13, the route setter 41 may be mounted in the vehicle 1 or may be embodied by a computer of a mobile terminal (such as a tablet terminal) capable of communication with the vehicle 1 via a communication network.

To the route setter 41 is connected a data receiver 42 that communicates with an external entity via a communication network and receives given data from the external entity. The data of the travel route may be set and input, for example, as follows: the user sets and inputs the travel route to a mobile terminal (such as a tablet terminal) capable of communication with the vehicle 1 via a communication network, and the information set and input by the user is sent to the circuitry 13 of the vehicle 1 via a given server. Alternatively, an operation terminal connectable to the circuitry 13 to allow the user to set and input the travel route may be mounted on the vehicle 1.

In the configuration described above, the mode switcher 50 switches the vehicle 1 between the manned operation mode in which the vehicle 1 travels in response to operations on the operators and the autonomous travel mode in which the vehicle 1 autonomously travels on a given travel route without any operations on the operators. Thus, in the case of a routine work, carrying out the autonomous travel mode can eliminate the need for manned operation and reduce the workload. In the case of a temporary work, the manned operation mode can be carried out as necessary to use the utility vehicle 1 as a human-operated vehicle. As such, with the configuration described above, the utility vehicle 1 capable of autonomous travel on a given travel route can be utilized in a flexible way.

In the present embodiment, the vehicle 1 permits the presence of an occupant in the cabin C when the vehicle 1 is in the autonomous travel mode. That is, the vehicle 1 can travel in the autonomous travel mode regardless of whether any person is on board the vehicle 1.

Details of Autonomous Travel Mode

Hereinafter, the autonomous travel mode will be described in more detail. For example, the vehicle 1 is started up once the user performs a given start-up operation. Once the user performs an operation for switching to the autonomous travel mode, the mode switcher 50 sends to the circuitry 13 a mode switching signal for switching to the autonomous travel mode. After that, the circuitry 13 allows the route setter 41 to execute a process for travel route setting (travel route setting program).

In the case where a travel route is prestored in the storage, the travel route setting may be accomplished by retrieving the prestored travel route. In the case where any travel route is not prestored in the storage or where the vehicle 1 should travel on a travel route different from that used in the previous travel, the travel route setting may be performed anew. In this case, for example, the route setting may be performed using a mobile terminal communicatively connectable to the vehicle 1 by wire or wirelessly.

For example, a map is displayed on the mobile terminal, and pass points, a destination, etc. are set and input on the map. The route setter 41 executes the travel route setting program and sets a travel route based on pieces of information such as information of the input pass points, destination, etc., information of the vehicle location, and terrain information prestored in association with the map. For example, in the case where the vehicle 1 is used for patrolling a given area, the patrol area may be set and input on the map, and the route setter 41 may set a travel route such that the vehicle 1 travels all over the patrol area. After the travel route setting, the circuitry 13 starts autonomous travel.

Travel Control According to Road Condition

During autonomous travel in the autonomous travel mode, the circuitry 13 controls the travel structure 14 according to the road condition of a region ahead of the vehicle location in the travel direction. To this end, the circuitry 13 acquires road condition data of the travel area. In the road condition data, the travel area is divided into regions with different predetermined road condition levels. The road condition data is stored in a storage mounted in the vehicle 1 or stored in a storage device (such as a server or mobile terminal) external to the vehicle 1 and capable of communication with the vehicle 1 via a communication network.

Figure 3:
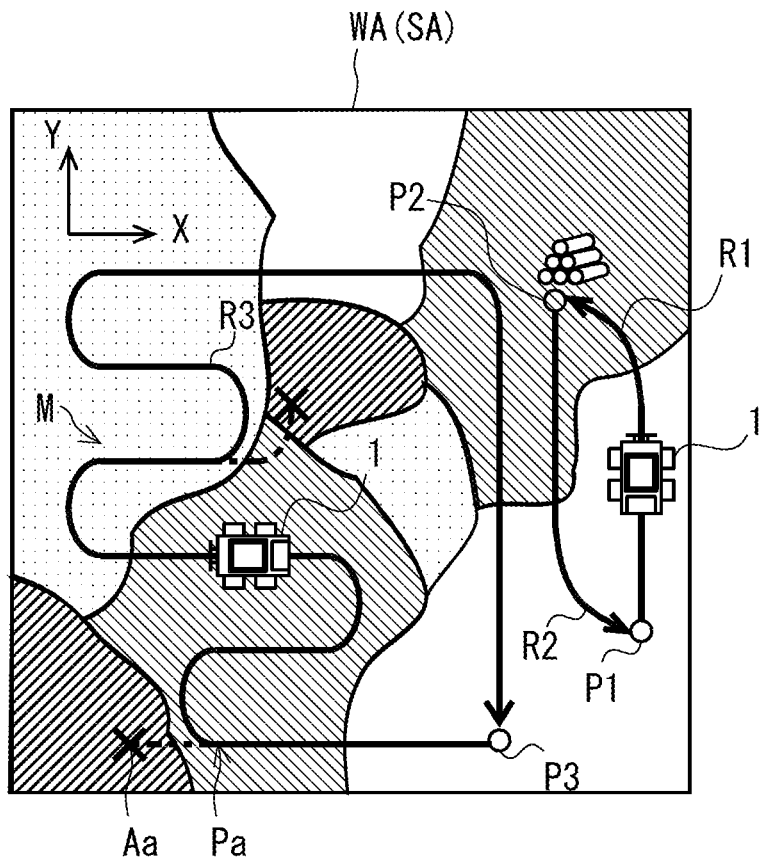
FIG. 3 is a plan view showing an example of a travel area of the utility vehicle of the exemplary embodiment.
Figure 3:
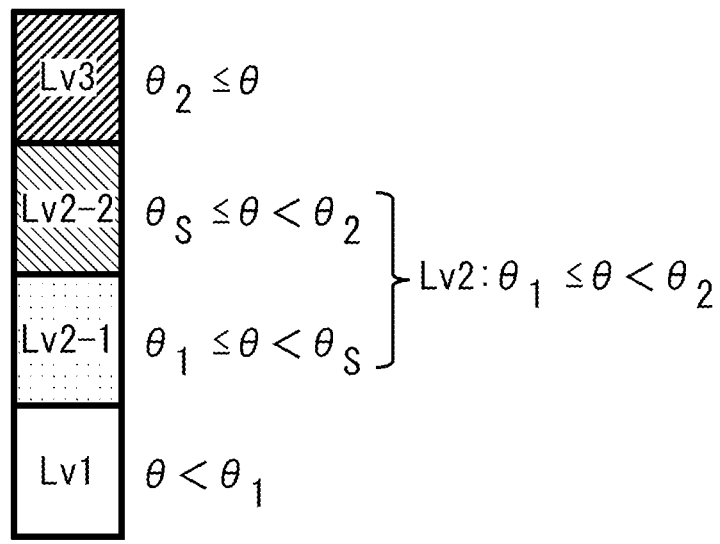
Figure 4:
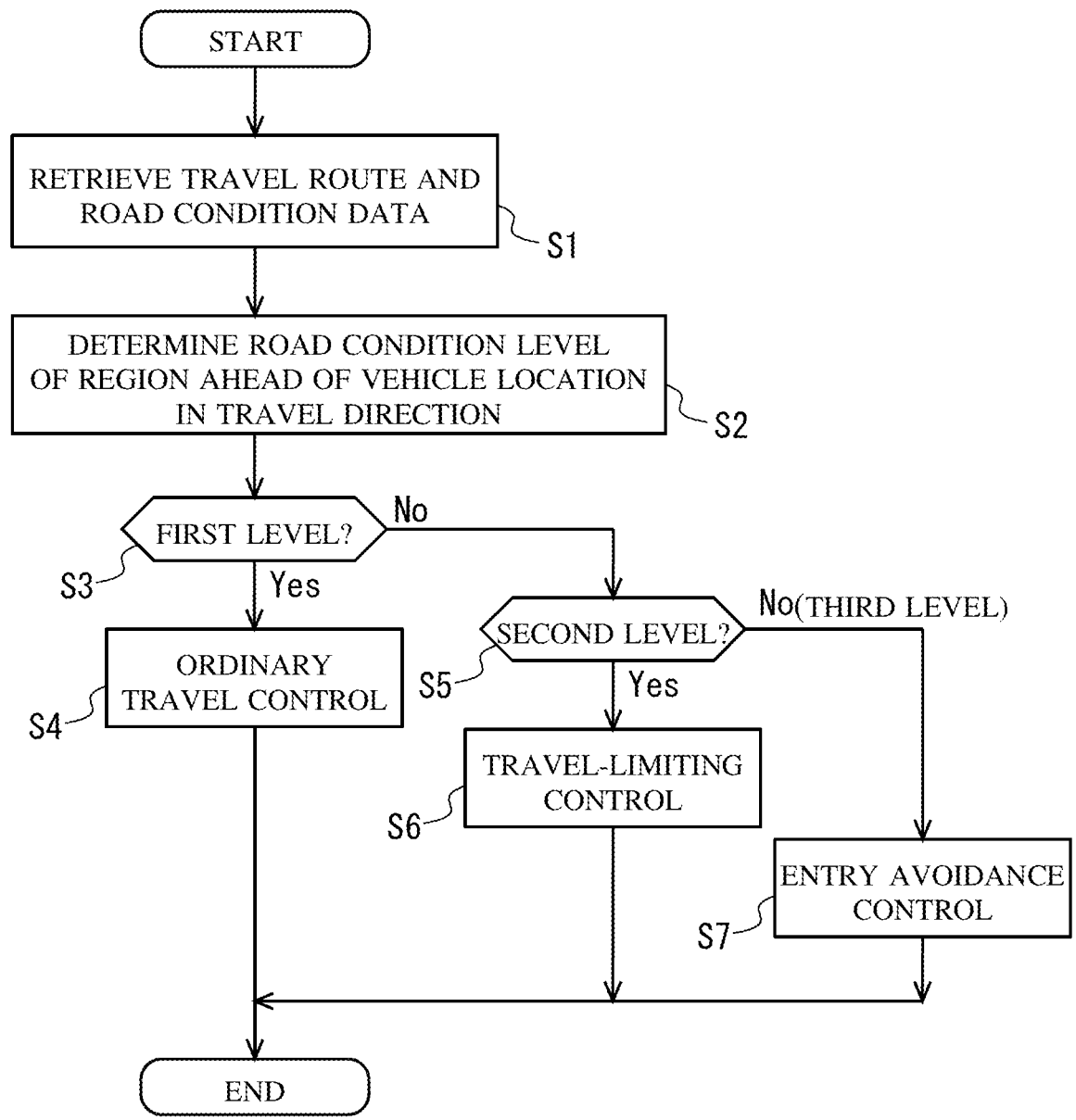
FIG. 4 is a flowchart for illustrating the flow of a travel control process performed according to the road condition in an autonomous travel mode of the exemplary embodiment.

FIG. 3 is a plan view showing an example of the travel area of the utility vehicle of the present embodiment. FIG. 4 is a flowchart for illustrating the flow of the travel control process performed according to the road condition in the autonomous travel mode of the present embodiment. In the example of FIG. 3, the vehicle 1 is used to perform a given work in a work area WA (e.g., a material yard). In the work area WA, the vehicle 1 is used, for example, for conveying materials or monitoring (patrolling) the work area WA. In the example of FIG. 3, the work area WA is predetermined as a travel area SA of the vehicle 1.

For example, routes on which the vehicle 1 moves back and forth between first and second points P1 and P2 in the work area WA (a first route R1 from the first point P1 to the second point P2 and a second route R2 from the second point P2 to the first point P1) can be set as travel routes for autonomous travel. For example, the first point P1 is set at a place from which materials are transported toward the outside, and the second point P2 is set at the material yard.

In this case, the vehicle 1 operated in the autonomous travel mode moves from the first point P1 to the second point P2 and stops at the second point P2. Materials are loaded onto the cargo bed 8 of the vehicle 1 at the second point P2. After loading of the materials, the vehicle 1 moves from the second point P2 to the first point P1 and stops at the first point P1. The materials are taken out of the cargo bed 8 at the first point P1. To carry out such a work, the vehicle 1 operated in the autonomous travel mode repeatedly moves back and forth between the first and second points P1 and P2.

For example, a patrol route that starts from a third point P3 in the work area WA and on which the vehicle 1 travels to monitor the work area WA may be set as a travel route for autonomous travel (third travel route R3). The third travel route R3 may include, for example, a meandering section M where the vehicle 1 repeats back-and-forth movements in a first direction X in the work area WA with interposition of a movement in a second direction Y between the movements in the first direction X.

As shown in FIG. 3, the work area WA set as the travel area SA is divided into regions with different predetermined road condition levels (four road condition levels Lv1, Lv2-1, Lv2-2, and Lv3 in the example of FIG. 3). The road condition data includes data representing the road condition levels of the different regions of the travel area SA.

Upon switching of the control mode to the autonomous travel mode, the circuitry 13 retrieves the travel route set by the route setter 41 and the road condition data (step S1). For example, the road condition data retrieval is performed by retrieving, on a real-time basis, a portion of data that represents the road condition of the region ahead of the vehicle location in the travel direction on the travel route.

During the autonomous travel, the circuitry 13 determines, based on the road condition data, to which of the road condition levels the road condition of the region ahead of the location of the vehicle 1 in the travel direction belongs (step S2). The circuitry 13 acquires the location and travel direction (bearing) of the vehicle 1 from the vehicle location detector 30 and consults the road condition data to identify the road condition level of the region of the travel area SA that is ahead of the vehicle location in the travel direction.

For example, the road condition is classified into the different levels according to a tilt angle θ at which the vehicle 1 is tilted during travel. The tilt angle of the vehicle may be set as either the pitch angle or roll angle. The tilt angle of the vehicle may be a three-dimensional angle determined taking into account both the pitch and roll angles. The first level Lv1 is assigned to a region where the tilt angle θ of the traveling vehicle 1 is smaller than a first angle $\theta_1$. The second level Lv2 is assigned to a region where the tilt angle θ of the traveling vehicle 1 is equal to or greater than the first angle $\theta_1$ and smaller than a second angle $\theta_2$ that is greater than the first angle $\theta_1$. The third level Lv3 is assigned to a region where the tilt angle θ of the traveling vehicle 1 is equal to or greater than the second angle $\theta_2$.

The second level Lv2 is divided into first and second sub-levels Lv2-1 and Lv2-2. The first sub-level Lv2-1 is assigned to a region where the tilt angle θ of the traveling vehicle 1 is equal to greater than the first angle $\theta_1$ and smaller than a sub-angle $\theta_S$ that is greater than the first angle $\theta_1$ and smaller than the second angle $\theta_2$. The second sub-level Lv2-2 is assigned to a region where the tilt angle θ of the traveling vehicle 1 is equal to or greater than the sub-angle $\theta_S$ and smaller than the second angle $\theta_2$.

The circuitry 13 controls the travel structure 14 such that a given travel parameter is within a corresponding one of permissible ranges predetermined respectively in association with the road condition levels (steps S3 to S7). Specifically, the circuitry 13 determines whether the road condition level is the first level Lv1 (step S3). Upon determining that the road condition level is the first level Lv1 (Yes in step S3), the circuitry 13 performs ordinary control involving no limitations (step S4).

Upon determining that the road condition level is not the second level Lv2 (No in step S3), the circuitry 13 determines whether the road condition level is the second level Lv2 (step S5). Upon determining that the road condition level is the second level Lv2 (Yes in step S5), the circuitry 13 performs travel-limiting control (step S6). Upon determining that the road condition level is not the second level Lv2 but the third level Lv3 (No in step S5), the circuitry 13 performs control to avoid entry of the vehicle 1 into the region with the third level Lv3 (step S7).

The following describes an example where the travel parameter includes the velocity and steering angle. In this example, in case that the road condition level is the first level Lv1, the circuitry 13 controls the travel structure 14 without a velocity limitation or steering angle limitation that is based on the road condition level. Thus, ordinary travel control is performed when the road condition is such as to allow the vehicle 1 to assume a stable orientation. In this case, a velocity limitation other than that based on the road condition level may be imposed in a certain situation such as during cornering of the vehicle 1 or during travel in a predetermined velocity-limited region.

In case that the road condition level is the second level Lv2, the circuitry 13 controls the travel structure 14 such that the velocity of the vehicle 1 is equal to or lower than a first threshold velocity V1. In case that the road condition level is the second sub-level Lv2-2, the circuitry 13 not only imposes the velocity limitation but also controls the travel structure 14 such that the steering angle is equal to or smaller than a given threshold angle θ. The circuitry 13 does not impose the steering angle limitation in case that the road condition level is the first sub-level Lv2-1 or first level Lv1.

Thus, a velocity limitation is imposed when the road condition is such that the vehicle 1 passes through a crossable obstacle (such as a rocky or depressed place) or moves on a relatively steep slope. The steering angle range is also limited depending on the severity of the obstacle or the steepness of the slope. This can reduce the likelihood that the vehicle 1 overturns due to being steered at a great angle when the vehicle 1 is traveling in a tilted orientation such as during passage through an obstacle.

As described above, when the road condition level is the second level Lv2 for which the travel-limiting control should be performed, the travel-limiting control differs depending on whether the second level Lv2 is the sub-level Lv2-1 or Lv2-2. The travel-limiting control may be varied by increasing or decreasing the number of the travel parameters of interest as described above, by broadening or narrowing the permissible range of any of the travel parameters, or by a combination of the increase or decrease in the number of the travel parameters and the broadening or narrowing of the permissible range of any of the travel parameters.

In case that the road condition level is the third level Lv3, the circuitry 13 controls the travel structure 14 to avoid entry of the vehicle 1 into the region with the third level Lv3. For example, when the vehicle 1 is at a point Pa in FIG. 3, the circuitry 13 determines the road condition level of a region Aa ahead of the vehicle 1 in the travel direction. As the road condition level of the region Aa is the third level Lv3, the circuitry 13 allows the vehicle 1 to turn without entering the region Aa. In response to this turning, the route setter 41 sets the travel route anew.

In the configuration described above, during the autonomous travel of the vehicle 1, the travel structure 14 is controlled in different ways depending on the road condition level of the region ahead of the vehicle location in the travel direction. Thus, autonomous travel control in a place with a bad road condition can be made different from that in a place with a good road condition; for example, the vehicle velocity during autonomous travel can be reduced in a place with a bad road condition. As such, the autonomous travel of the vehicle 1 able to travel on rough terrain can be controlled appropriately according to the road condition.

For the permissible range of the travel parameter, not only an upper limit but also a lower limit can be set. For example, when the road condition level is the second level Lv2 for which the travel-limiting control should be performed, the circuitry 13 may set not only an upper velocity limit but also a lower velocity limit (minimum velocity during steady travel). This allows for appropriate travel control on a road where the vehicle 1 can be stuck if traveling at a low velocity. That is, the likelihood of the vehicle 1 being stuck can be reduced.

The travel parameter to be controlled is not limited to those described above. For example, the travel parameter may include the acceleration, the gear ratio, the damping forces of the suspensions, and the vehicle height in addition to the velocity and steering angle described above. For example, when the road condition level is the second level Lv2 for which the travel-limiting control should be performed, the circuitry 13 controls the travel structure 14 such that the acceleration is equal to or lower than a given threshold acceleration. This can prevent an undesired event such as slip caused by rapid acceleration on a slippery road.

In an example where the vehicle 1 includes a multi-speed transmission that is selectively switchable between different values of the gear ratio (the ratio of the rotational speed of the output shaft of the drive source 9 to the rotational speed of the output shaft of the transmission), when the road condition level is the second level Lv2 for which the travel-limiting control should be preformed, the circuitry 13 controls the travel structure 14 such that one of the gear ratio values that is equal to or smaller than a threshold gear ratio is selected (such that the transmission is in a gear position higher than a threshold gear position). This can prevent an undesired event such as slip caused by increased output torque on a slippery road.

In an example where the vehicle 1 includes a damping force-adjusting structure that adjusts the damping forces of the suspensions through hydraulic pressure control or electronic control, when the road condition level is the second level Lv2 for which the travel-limiting control should be performed, the circuitry 13 controls the travel structure 14 to reduce the damping forces of the suspensions. In an example where the vehicle 1 includes a vehicle height-adjusting structure, when the road condition level is the second level Lv2 for which the travel-limiting control should be performed, the circuitry 13 controls the travel structure 14 to increase the vehicle height.

The circuitry 13 may acquire, from the data receiver 42, given data related to the load-carrying condition or surroundings of the vehicle 1 and may, based on the acquired data, correct the permissible ranges associated with the road condition levels. For example, the vehicle 1 detects the weight of cargo carried on the cargo bed 8 and/or the number of occupants seated on the seat structures 5A and 5B. The detected weight of the cargo and/or the detected number of the seated occupants is sent to the circuitry 13 via the data receiver 42.

For example, in case that the weight of the cargo is equal to or greater than a given threshold weight and/or the number of the seated occupants is equal to or greater than a given threshold number, the circuitry 13 narrows the permissible range of the travel parameter to be controlled in the travel-limiting control performed when the road condition level is the second level Lv2. For instance, in the above example, when the road condition level is the first sub-level Lv2-1, the circuitry 13 changes the permissible range of the velocity to a range up to a second threshold velocity V2 lower than the first threshold velocity V1.

Alternatively, in case that the weight of the cargo is equal to or greater than a given threshold weight and/or the number of the seated occupants is equal to or greater than a given threshold number, the circuitry 13 may change the road condition level to a next higher level (level for which a stricter limitation is imposed). Specifically, in the above example, when the road condition level is the first sub-level Lv2-1, the circuitry 13 may perform the travel-limiting control for the second sub-level Lv2-2; that is, the circuitry 13 may limit the steering angle in addition to imposing a velocity limitation. When the road condition level is the second sub-level Lv2-2, the circuitry 13 may perform control for the third level Lv3; that is, the circuitry 13 may perform control to avoid entry of the vehicle 1 into the region of concern.

The data related to the surroundings of the vehicle 1 may include, for example, weather, atmospheric temperature, atmospheric pressure, season, date and time, geographical zone (climate zone), and ground type (such as muddy area, marshy area, sand beach, or desert). One of these kinds of data may be used, or two or more thereof may be used in combination. The data related to the surroundings (such as weather, season, date and time, and geographical zone) is accumulated, for example, in a server communicatively connected to the data receiver 42 of the vehicle 1 via a communication network, and is sent to the data receiver 42 from the server. Alternatively, the data related to the surroundings (such as atmospheric temperature, atmospheric pressure, and road state) may be, for example, values detected by sensors mounted on the vehicle 1.

For example, in case that the weather is rainy or the atmospheric pressure is equal to or lower than a given threshold atmospheric pressure, the circuitry 13 may narrow the permissible range of the travel parameter to be controlled in the travel-limiting control performed when the road condition level is the second level Lv2, or may change the road condition level to a higher level. For example, in case that the vehicle 1 is traveling on a type of ground such as a muddy area where the vehicle 1 is likely to be stuck or in case that the atmospheric temperature is equal to or lower than a given threshold temperature (such as when the atmospheric temperature is a sub-zero temperature), the circuitry 13 may set the minimum velocity during steady travel to a third threshold velocity V3 or higher velocity.

As described above, the travel parameter permissible range associated with the road condition level may be changed in response to a change in the weight or surroundings of the vehicle 1. This allows for travel control appropriate for the actual circumstances.

Estimation of Road Condition

The vehicle 1 includes a road condition estimator 43 that creates the road condition data. The road condition estimator 43 may be configured as a functional block of the circuitry 13 or configured as a processor separate from the circuitry 13.

The road condition estimator 43 creates the road condition data by estimating the road condition at the vehicle location from a given travel indicator and determining, based on the result of the estimation, to which of the predetermined road condition levels the road condition belongs. The travel indicator includes at least one indicator indicating a travel state of the vehicle 1, and is acquired by a travel indicator acquirer 44.

For instance, in the above example, the travel indicator is the pitch angle and/or roll angle indicating the orientation of the vehicle 1. Thus, the travel indicator acquirer 44 includes the pitch angle sensor 22 and/or roll angle sensor 23. Additionally or alternatively, the travel indicator acquirer 44 may include any of the other sensors 15 to 21 depending on the travel indicator to be acquired. FIG. 2 shows an example where the travel indicator acquirer 44 includes the sensors 15 to 23 and a digital model creator 45 described later. Only the sensors for acquiring the travel indicator of interest may function as components of the travel indicator acquirer 44, and the other sensors need not function as components of the travel indicator acquirer 44.

For example, the travel indicator may include a first travel indicator indicating the orientation of the vehicle 1. Additionally or alternatively, the travel indicator may include a second travel indicator indicating forces acting on the front wheels 2 and/or rear wheels 3 (the forces will be referred to as "force on wheel" hereinafter).

The first travel indicator indicating the orientation of the vehicle 1 can be acquired by measuring the pitch angle and/or roll angle directly as described above. The travel indicator acquirer 44 may correct the first travel indicator using one or more of the then acquired other indicators such as the accelerator position, the braking intensity, the steering angle, the rotational speed of the output shaft of the drive source 9, the vehicle velocity, the wheel rotational speed, and the amounts of extension or compression of the suspensions.

The second travel indicator indicating the force on wheel of the vehicle 1 includes, for example, a slip ratio determined for the wheels. The slip ratio is obtained by measuring the vehicle velocity and the wheel rotational speed, subtracting the vehicle velocity from the wheel rotational speed, and dividing the resulting difference by the vehicle velocity. The travel indicator acquirer 44 may correct the second travel indicator using one or more of the then acquired other indicators such as the accelerator position, the braking intensity, the steering angle, the rotational speed of the output shaft of the drive source 9, the amounts of extension or compression of the suspensions, the pitch angle, and the roll angle.

The travel indicator is not limited to being acquired directly from the value measured by the corresponding sensor. For example, the travel indicator acquirer 44 may include a digital model creator 45 that creates a digital model of the vehicle 1. In this case, the travel indicator acquirer 44 detects at least one vehicle state value indicating a state of the vehicle 1. The digital model creator 45 creates a digital model related to the travel state of the vehicle 1 based on the at least one vehicle state value. The travel indicator acquirer 44 extracts the travel indicator from the digital model. For example, the digital model creator 45 may create the digital model of the vehicle 1 using vehicle state values such as the pitch and roll angles which are related to the orientation of the vehicle 1. The travel indicator acquirer 44 may extract grip forces of the wheels 2 and 3 of the created digital model as the travel indicator.

When acquiring the travel indicator, the travel indicator acquirer 44 may correct the travel indicator based on a result of detection by the forward environment detector 29. For example, in the case where the forward environment detector 29 is a camera, the travel indicator acquirer 44 analyzes an image captured by the forward environment detector 29 for the environment ahead of the vehicle 1 and thus estimates the friction coefficient of the travel road. The travel indicator acquirer 44 uses the estimated friction coefficient to correct the travel indicator measured or obtained from the digital model. For example, the travel indicator acquirer 44 may estimate the orientation of the vehicle 1 by analyzing an image captured by the forward environment detector 29 for the environment ahead of the vehicle 1, and correct the travel indicator based on the estimated orientation.

The road condition estimator 43 creates the road condition data by estimating the road condition on the travel route traveled in the manned operation mode and associating the travel route with a corresponding one of the road condition levels. In this case, the travel indicator acquirer 44 acquires the travel indicator at different vehicle locations during travel in the manned operation mode. The road condition estimator 43 estimates the road condition at each of the vehicle locations from the travel indicator and determines to which of the road condition levels the road condition at each vehicle location belongs.

The circuitry 13 stores the determined road condition levels in association with data of the vehicle locations. In the case where there is previously stored data of the road condition level at a vehicle location, the circuitry 13 may overwrite the previously stored data with new data acquired for the vehicle location or update the road condition data by averaging the previously stored data and the newly acquired data. In the travel area SA, a region that has never been traveled is set as a non-travelable region. The road condition data may be stored in a storage mounted in the vehicle 1 or stored in a storage device (such as a server or mobile terminal) external to the vehicle 1 and capable of communication with the vehicle 1 via a communication network.

As described above, the road condition estimator 43 determines the road condition level on the travel route traveled in the manned operation mode and stores the determined road condition level in association with the vehicle location. In this manner, the road condition estimator 43 performs road condition level mapping in the given travel area SA. The mapped data is stored as the road condition data (road condition map).

As described above, the road condition data creation is performed during travel in the manned operation mode. This makes it possible to safely create the road condition data that reflects the real road condition.

For the road condition in a region of the travel area SA that has not been traveled in the manned operation mode, the road condition estimator 43 may analogically apply road condition data of a region adjacent to the untraveled region. Alternatively, the road condition estimator 43 may set the untraveled region as a non-travelable region (third level Lv3).

The road condition estimator 43 may estimate the road condition on the travel route traveled by the vehicle 1 in the autonomous travel mode using the above-described road condition data created in the manned operation mode, and may update the road condition data with the estimated road condition.

Instead of the road condition level mapping using the manned operation mode, the vehicle 1 may be allowed to travel in the autonomous travel mode without travel control that takes into account the road condition, and the road condition estimator 43 may, during the travel in the autonomous travel mode, acquire the travel indicator and estimate the road condition based on the acquired travel indicator.

For example, the circuitry 13 controls the travel structure 14 to allow the vehicle 1 to autonomously travel in a predetermined travel pattern or on a travel route set by the user. The road condition estimator 43 creates the road condition data by estimating the road condition during the autonomous travel and associating the travel route with a corresponding one of the road condition levels. For example, in the event that the vehicle 1 overturns, that the indicator (such as the roll angle or pitch angle) indicating the orientation of the vehicle 1 exceeds a threshold, or that the vehicle 1 becomes incapable of traveling due to being stuck or for any reason, the road condition level at the location of the event is set to the third level Lv3.

As described above, the road condition data creation may be performed by allowing the vehicle 1 to autonomously travel. In this case, road condition data reflecting the real road condition can be created with reduced manpower. The road condition estimator 43 may estimate the road condition on the travel route traveled in the autonomous travel mode using the created road condition data, and may update the road condition data with the estimated road condition.

Alternatively, the road condition data may be created through a travel simulation of a virtual vehicle modeled on the vehicle 1. The travel simulation may be performed by the road condition estimator 43 or by a computer external to the vehicle 1 and capable of communication with the vehicle 1 via a communication network. An independent computer that does not communicate with the vehicle 1 may perform the travel simulation, and the road condition data obtained as a result of the simulation may be transferred to a storage such as that of the vehicle 1 through means such as a recoding medium.

For the travel simulation, terrain data of the travel area SA is prepared. The terrain data is created, for example, from a satellite image. The computer that performs the travel simulation creates a virtual travel space based on road geometry data of the travel area SA. The computer further creates a virtual vehicle modeled on the vehicle 1 and places the virtual vehicle in the virtual travel space.

The computer performs the travel simulation, in which the virtual vehicle is allowed to travel in the created virtual travel space. The virtual vehicle changes its travel state in response to terrain changes in the virtual travel space. The orientation of the virtual vehicle, the force on wheel of the virtual vehicle, or any other indicator is acquired as a travel indicator, from which the road condition is estimated. Based on the result of the estimation of the road condition, the computer divides the virtual travel space into regions with different road condition levels, thereby creating the road condition data (road condition map). In such a travel simulation, machine learning can be used.

For example, supervised machine learning may be performed to make a classification into different road condition levels. Alternatively, unsupervised learning may be performed to assign different road condition levels to regions classified according to the road condition and define the permissible range of the travel parameter for each road condition level.

The road condition data of the virtual travel space, which is obtained by the above travel simulation, is used as the road condition data of the real travel area SA. The road condition estimator 43 may estimate the real road condition on the travel route traveled in the autonomous travel mode using the road condition data of the virtual travel space, and may update the road condition data with the estimated road condition.

As described above, the road condition data creation may be performed through a travel simulation. In this case, road condition data covering the entire travel area SA can be safely created.

The road condition levels included in the road condition data may be one-dimensionally set in terms of one factor (the orientation of the vehicle 1) as in the example of FIG. 3. Alternatively, the road condition levels may be two-dimensionally or multidimensionally set in terms of a combination of different factors. For example, a one-dimensional first-type road condition level based on the vehicle orientation and a one-dimensional second-type road condition level based on an estimated friction coefficient of the road may be combined in a matrix fashion to create road condition data including a two-dimensional road condition level.

For example, in the case of a road where the first-type road condition level is low (the road is flat or gently sloping) but where the second-type road condition level is high (the road is slippery), the circuitry 13 may perform control for limiting rapid acceleration or limiting the maximum velocity during turning. In such a case, it can be envisaged that the vehicle 1 travels in mud or in water (river crossing). Thus, in order to prevent the vehicle 1 from being stuck, the circuitry 13 may perform control to allow the vehicle 1 to travel at a velocity equal to or higher than a predetermined minimum velocity.

During travel of the vehicle 1, data related to the surroundings (such as weather, atmospheric temperature, atmospheric pressure, season, date and time, geographical zone, and ground type) may be acquired while the road condition is estimated, and the road condition level at a location may be varied according to the indicator of the surroundings. For example, the road condition level at a location may be the first sub-level Lv2-1 in fine weather and the second sub-level Lv2-2 in rainy weather. In this manner, different road condition levels may be set for one location by taking into account factors other than the road condition.

In determining the road condition level of a region ahead of the vehicle 1 in the travel direction, the circuitry 13 may make the determination for the pair of left wheels 2 and 3 and for the pair of right wheels 2 and 3. In this case, for example, the circuitry 13 detects the roll angle and, upon detecting that the roll angle is equal to or greater than a threshold, determines that the vehicle 1 is moving across a slope. In case that the vehicle 1 is determined to be moving across a slope and the road condition level is the second level Lv2 for which the travel-limiting control (velocity limitation) should be performed, the circuitry 13 may limit not only the velocity but also the steering angle range. In case that the vehicle 1 is determined not to be moving across a slope and the road condition level is the second level Lv2, the circuitry 13 may limit only the velocity without limiting the steering angle range.

In determining the road condition level of a region ahead of the vehicle 1 in the travel direction, the circuitry 13 may make the determination for each of the four wheels.

In the example of FIG. 3, the road condition level (second level Lv2) for which the travel-limiting control is performed includes the two sub-levels Lv2-1 and Lv2-2 differing in the permissible range or type of the travel parameter. However, the present disclosure is not limited to this example. That is, the road condition level (second level Lv2) for which the travel-limiting control is performed may be associated with one way of control or may include three or more sub-levels.

Examples of road conditions for which the permissible range or type of the travel parameter may be varied (for which the travel-limiting control may be performed) include wet paved road, gravel road, farming land, grass field, steep slope, river, rocky area, snow surface, mud, sand beach, and desert.

The road condition data as created in any of the above-described examples may be used for travel route setting. That is, the route setter 41 may set a travel route based on the road condition data. For example, in the case where different travel routes can be set for movement of the vehicle 1 from the current location to a desired destination, the route setter 41 chooses one of the travel routes that has the smallest value of the distance over which the road condition level is equal to or higher than a given level (e.g., the second sub-level Lv2-2) for which travel is permitted.

In the case where the user can set a priority requirement for travel route setting, the route setter 41 sets a travel route that is best fitted to the priority requirement. For example, in the case where priority is given to the travel distance in travel route setting for movement of the vehicle 1 to a desired destination, the route setter 41 permits choosing a route where the road condition level is equal to or higher than a somewhat high level (e.g., the second sub-level Lv2-2). For example, in the case where priority is given to the required time in travel route setting for movement of the vehicle 1 to a desired destination, the route setter 41 chooses a travel route that requires the shortest time while taking into account velocity limits associated with the road condition levels.

For example, in the case where priority is given to reduced variations in the orientation of the vehicle 1 in travel route setting for movement of the vehicle 1 to a desired destination, the route setter 41 chooses a travel route with the smallest value of the distance over which the road condition level is equal to or higher than a given level (e.g., the second sub-level Lv2-2) for which travel is permitted. In this case, the travel route set by the route setter 41 may be one with the lowest occurrence of a state where the road condition level differs between the road with which the left wheels 2 and 3 are in contact and the road with which the right wheels 2 and 3 are in contact.

In the road condition data creation through real travel or machine learning, a group of routes traveled by the vehicle 1 or virtual vehicle (routes on which the vehicle 1 or virtual vehicle did not become incapable of traveling) may be recorded as candidate travel routes. The route setter 41 may select the best route from the group of routes based on travel route setting data such as the destination or may combine different routes included in the group of routes and set the resulting combination as a travel route.

Setting a travel route based on the road condition data can reduce the number of times that the travel route is changed during autonomous travel, thus allowing for efficient travel of the vehicle 1.

The factors for travel route setting may include data other than the road condition. For example, the forward environment detector 29 is configured to detect a monitoring target such as a person or an animal by analyzing a captured image, and in case that the forward environment detector 29 finds the monitoring target during autonomous travel or travel by manned operation, the circuitry 13 stores the then vehicle location as encounter history data in the storage or the like. During travel by manned operation, a user on board the vehicle 1 can make a given operation input to record the then vehicle location as a spot where the monitoring target was detected. The route setter 41 may change a part or all of the travel route based on the encounter history data.

For example, the route setter 41 may set a travel route that avoids a spot where the monitoring target has often been encountered. This can reduce the risk of contact with a person or an animal. It is also possible to reduce the likelihood that the vehicle 1 is attacked or robbed of cargo when traveling in a conflict-affected area or crime-ridden area for a purpose such as transportation of goods.

Alternatively, the route setter 41 may set a travel route that preferentially passes through a spot where the monitoring target has often been encountered. Thus, in the case where the vehicle 1 is allowed to travel for patrol (monitoring) of the travel area SA in an extensive farming land or forest, a travel route can be set along which the target is found efficiently.

For example, the forward environment detector 29 is configured to detect an illuminant by analyzing a captured image during travel in the night, and in case that the forward environment detector 29 detects the illuminant (such as a private house, a searchlight, or a spark) during autonomous travel or travel by manned operation in the night, the circuitry 13 stores the then vehicle location as illuminant history data in the storage or the like. During travel by manned operation, a user on board the vehicle 1 can make a given operation input to record the then vehicle location as a spot where the illuminant was detected. The route setter 41 may change a part or all of the travel route based on the illuminant history data.

Other Embodiments

Although the foregoing has described an exemplary embodiment of the present disclosure, the present disclosure is not limited to the above embodiment, and various modifications, changes, and adaptations can be made without departing from the gist of the present disclosure.

For example, although in the above embodiment the same circuitry 13 performs both control in the manned operation mode and control in the autonomous travel mode, the present disclosure is not limited to this configuration. For example, the vehicle 1 may include first circuitry (first ECU) that controls the vehicle 1 in the manned operation mode and second circuitry (second ECU) that controls the vehicle 1 in the autonomous travel mode.

Although in the above embodiment the vehicle 1 is capable of travel by manned operation, the control in the autonomous travel mode of the above embodiment may be applied to a vehicle 1 specialized for autonomous travel.

Although in the above embodiment the vehicle 1 includes the road condition estimator 43, the vehicle 1 need not include the road condition estimator 43. That is, elements other than the circuitry 13 are not needed so long as the circuitry 13 is configured to acquire the road condition data from a storage of the vehicle 1 or an external storage, determine to which of the road condition levels the road condition of a region ahead of the vehicle 1 in the travel direction belongs, and control the travel structure 14 such that a given travel parameter is within a corresponding one of permissible ranges predetermined respectively in association with the road condition levels.

The road condition data in the above embodiment may be data shared among different types of vehicles. In the case where the different types of vehicles have different travel abilities, the travel parameter permissible range or travel parameter type associated with each of the road condition levels may vary among the different types of vehicles.

For instance, in the case of a first vehicle having a high ability to travel on bad roads, the travel control is performed as described in the above example; that is, the velocity is limited for the first sub-level Lv2-1, while the velocity and steering angle range are limited for the second sub-level Lv2-2. In the case of a second vehicle having a lower ability to travel on bad roads than the first vehicle, the upper velocity limit for the first sub-level Lv2-1 may be lower than in the case of the first vehicle, and the steering angle range may also be limited for the first sub-level Lv2-1. For a region with the second sub-level Lv2-2, control may be performed to avoid entry of the vehicle 1 into the region.

To this end, travel abilities may be classified into different travel ability levels, one of the travel ability levels may be assigned to the vehicle 1 based on the travel ability of the vehicle 1, and the assigned travel ability level may be stored in the storage or the like as data that the circuitry 13 retrieves for travel control. After determining the road condition level, the circuitry 13 may retrieve the travel ability level of the vehicle 1 and determine the details of the travel control according to the road condition level and the travel ability level.

REFERENCE SIGNS LIST 1 utility vehicle (vehicle)
2 front wheel
3 rear wheel
9 drive source
10, 12 operator
11 steering structure
13 circuitry
14 travel structure
30 vehicle location detector
41 route setter
43 road condition estimator
44 travel indicator acquirer
50 mode switcher

The invention claimed is:

1. A utility vehicle comprising:
a travel structure including a front wheel, a rear wheel, a steering structure mounted to the front wheel, and a drive source that drives the front wheel and/or the rear wheel;
circuitry that controls the travel structure to effect autonomous travel without manned operation in a given travel area; and
a vehicle location detector that detects a location of the utility vehicle,
wherein road condition data, in which the travel area is divided into regions with different predetermined road condition levels, is prestored in a storage mounted in the utility vehicle or a storage capable of communication with the utility vehicle via a communication network,
wherein during the autonomous travel, the circuitry retrieves the road condition data from the storage and determines, based on the road condition data, to which of the road condition levels a road condition of a region ahead of the location of the utility vehicle in a travel direction belongs,
wherein the road condition levels include two-dimensional road condition levels each of which includes a combination of a first-type road condition level and a second-type road condition level which are set in terms of different factors,
wherein the circuitry controls the travel structure such that each of a plurality of given travel parameters is within a corresponding one of permissible ranges predetermined respectively in association with the two-dimensional road condition levels,
wherein the first-type road condition level is a road condition level based on at least a pitch angle or a roll angle of the utility vehicle, and
wherein the second-type road condition level is a road condition level based on an estimated road friction coefficient.

2. The utility vehicle according to claim 1, further comprising:
a travel indicator acquirer that acquires at least one travel indicator indicating a travel state of the utility vehicle; and
a road condition estimator that creates the road condition data by estimating a road condition at the location of the utility vehicle from the travel indicator and determining, based on a result of the estimation, to which of the road condition levels the estimated road condition belongs.

3. The utility vehicle according to claim 2, further comprising:
at least one operator used to operate the travel structure; and
a mode switcher that switches the utility vehicle between a manned operation mode in which the utility vehicle travels in response to operations on the operator and an autonomous travel mode in which the circuitry allows the utility vehicle to autonomously travel on a given travel route without any operations on the operator,
wherein the road condition estimator creates the road condition data by estimating a road condition on the travel route traveled in the manned operation mode and associating the travel route with a corresponding one of the road condition levels.

4. The utility vehicle according to claim 2,
wherein the travel indicator includes a first travel indicator indicating an orientation of the utility vehicle and a second travel indicator indicating a force acting on the front wheel and/or the rear wheel.

5. The utility vehicle according to claim 1,
wherein the circuitry acquires given data related to a load-carrying condition of the utility vehicle or related to surroundings of the utility vehicle and corrects the permissible ranges associated with the road condition levels based on the given data.

6. The utility vehicle according to claim 1,
wherein the travel parameter includes at least one of a velocity, an acceleration, or a steering angle.

7. The utility vehicle according to claim 1, further comprising a route setter that sets a travel route for the autonomous travel,
wherein the route setter sets the travel route based on the road condition data.

8. A utility vehicle comprising:
a travel structure including a front wheel, a rear wheel, a steering structure mounted to the front wheel, and a drive source that drives the front wheel and/or the rear wheel;
circuitry that controls the travel structure to effect autonomous travel without manned operation in a given travel area; and
a vehicle location detector that detects a location of the utility vehicle,
wherein during the autonomous travel, the circuitry determines, based on road condition data where the travel area is divided into regions with different predetermined road condition levels, to which of the road condition levels a road condition of a region ahead of the location of the utility vehicle in a travel direction belongs, and the circuitry controls the travel structure such that a given travel parameter is within a corresponding one of permissible ranges predetermined respectively in association with the road condition levels, wherein the road condition levels include:
  a first level assigned to a region where a tilt angle of the utility vehicle is smaller than a first angle or a roll angle of the utility vehicle is smaller than a first roll angle;
  a second level assigned to a region where the tilt angle is equal to or greater than the first angle and smaller than a second angle that is greater than the first angle; and
  a third level assigned to a region where the tilt angle is equal to or greater than the second angle, wherein the travel parameter includes a velocity, wherein in case that the road condition level is the first level, the circuitry controls the travel structure without a velocity limitation that is based on the road condition level, wherein in case that the road condition level is the second level, the circuitry controls the travel structure such that the velocity is equal to or lower than a first threshold velocity, and wherein in case that the road condition level is the third level, the circuitry controls the travel structure to avoid entry of the utility vehicle into the region with the third level.

* * * * *